(12) United States Patent
Aoiz Miguel et al.

(10) Patent No.: US 8,262,532 B2
(45) Date of Patent: Sep. 11, 2012

(54) LOW-RATIO REDUCER-MULTIPLIER TRANSMISSION SYSTEM

(75) Inventors: Pedro Aoiz Miguel, San Sebastián (ES); Iñigo Garcia-Eizaga Telleria, San Sebastián (ES)

(73) Assignee: Sapa Placencia, S.L., Andion, Guipuzcoa (ES)

( * ) Notice: Subject to any disclaimer, the term of this patent is extended or adjusted under 35 U.S.C. 154(b) by 500 days.

(21) Appl. No.: 12/017,842

(22) Filed: Jan. 22, 2008

(65) Prior Publication Data

US 2008/0182697 A1    Jul. 31, 2008

(30) Foreign Application Priority Data

Jan. 23, 2007   (EP) .................................. 07380013

(51) Int. Cl.
*F16H 3/44*   (2006.01)

(52) U.S. Cl. .................. 475/282; 475/314; 475/320

(58) Field of Classification Search ............ 475/282, 475/311, 314, 317, 320
See application file for complete search history.

(56) References Cited

U.S. PATENT DOCUMENTS

| | | | |
|---|---|---|---|
| 4,043,225 A * | 8/1977 | Momose | 475/276 |
| 4,559,848 A | 12/1985 | Kerr | |
| 5,106,352 A * | 4/1992 | Lepelletier | 475/280 |
| 5,358,458 A * | 10/1994 | Hicks | 475/269 |
| 7,214,154 B2 * | 5/2007 | Klemen et al. | 475/5 |
| 7,294,087 B2 * | 11/2007 | Hayabuchi et al. | 475/276 |
| 7,367,911 B2 * | 5/2008 | Raghavan et al. | 180/65.25 |

FOREIGN PATENT DOCUMENTS

GB            1 272 793        5/1972

* cited by examiner

*Primary Examiner* — Ha D. Ho
(74) *Attorney, Agent, or Firm* — Merchant & Gould P.C.

(57) ABSTRACT

A low-ratio transmission system configured to obtain the multiplication or reduction of speed, and the reduction or multiplication of stress between an input shaft and an output shaft with at least four different values, such that the input-output ratio can be close to one and furthermore that the four values form a geometric progression close to one.

4 Claims, 1 Drawing Sheet

LOW-RATIO REDUCER-MULTIPLIER TRANSMISSION SYSTEM

OBJECT OF THE INVENTION

The object of the present invention is to obtain the multiplication or reduction of speed and the reduction or multiplication of stress between an output shaft with at least four different values, such that the input-output ratio can be close to one and furthermore the four values form a geometric progression close to one.

FIELD OF THE INVENTION

The field of the invention is the use in any machine which must control the output speed and/or stress thereof regardless of the input speed and/or stress.

BACKGROUND OF THE INVENTION

In the current state of the art, a planet gear formed by a ring gear, a sun gear and a planet carrier made up of n planets meshing with the ring gear and sun gear is known as the conventional planet gear.

There are a number of automatic and semi-automatic transmission systems such as for example:

- Automatic transmission with 4-6-7 gears, made up of planetary gear trains, wet disc clutches and a torque converter.
- Semi-automatic transmissions with 16 gears, made up of two simple gear shafts simples with synchronizers and a main automatic clutch.
- Transmissions with multiple gears in which the use of a large number of planet gears is necessary.
- Binary logic transmissions, such as the one described in U.S. Pat. No. 4,559,848 which require the so-called reverted train loops, which are planet carriers of several sun gears and planets which are complex to carry out. Another binary type system is the one described in British patent document GB 1272793 which describes a system using planet gears for a binary-type transmission.

Nevertheless, none of the previously mentioned systems comprise the features described below.

SUMMARY OF THE INVENTION

The low-ratio reducer-multiplier transmission system, object of the present invention is essentially made up of two conventional planetary gear trains and four kinematic control elements. The ratio $R_i$ of a planet gear i is defined as the ratio between the number of teeth of the sun gear divided by the number of teeth of the ring gear. Therefore, the planet gear 1 will have ratio $R_1$ and the planet gear 2 ratio $R_2$.

Ratio $R_t$ is defined as the ratio between the transmission input and output speed, such that:

$$R_t = \frac{V_{input}}{V_{output}}$$

A kinematic control element is defined as any element restricting one degree of freedom for the system and the actuation of which (activation or deactivation) is controllable.

With this type of kinematic configuration and by combining the control elements a multiple-ratio speed reducer-multiplier $R_t$ is obtained, where said ratios are controlled by means of the control elements and with the suitable definition of ratios $R_1$ and $R_2$. The value of $R_1$ and $R_2$ is such that the resulting ratios $R_t$ may follow a geometric progression $X^n$, and where the ratio of said progression furthermore is a value that is not less than 1.06 and not more than 1.17 in reducers and not less than 0.85 and not more than 0.94 in multipliers. It must be taken into consideration that with a conventional planet gear system it is not possible to obtain an R that is less than 1.2 [reference] given the small size of the pinion needed.

In the configuration as a multiplier, the movement input is carried out by the planet carrier of the first planet gear whereas the movement output is carried out by the ring gear of the first planet gear.

The sun gear of the first planet gear is joined to the planet carrier of the second planet gear. The sun gear and the ring gear of the second planet gear are restricted with the actuation of the control elements:

- The brake control element B1 joins the sun gear of the second planet gear to the casing when it is activated.
- The clutch control element C1 joins the sun gear of the second planet gear to the movement input when it is activated.
- The brake control element B2 joins the ring gear of the second planet gear to the casing, when it is activated.
- The clutch control element C2 joins the ring gear of the second planet gear to the output, when it is activated.

The control logic can be seen in the following table:

| B1 | C1 | B2 | C2 | Rt |
|---|---|---|---|---|
| activated | Deactivated | Activated | deactivated | Rt1 |
| deactivated | Activated | Activated | deactivated | Rt2 |
| activated | Deactivated | Deactivated | activated | Rt3 |
| deactivated | Activated | Deactivated | activated | Rt4 |
| activated | Activated | Deactivated | deactivated | Rt5 |
| deactivated | Deactivated | Activated | activated | Rt6 |
| deactivated | Deactivated | Deactivated | deactivated | Rt7 |
| activated | Activated | Activated | activated | Rt8 |

Rt1: In this combination the sun gear of the second planet gear is joined to the casing by the brake control element B1 and its speed is therefore zero. Additionally, the ring gear of the second planet gear is also joined to the casing by the brake control element B2 and its speed is therefore also zero. Ratio Rt1 therefore has the expression:

$$Rt1 = \frac{1}{\frac{1}{1+R1}}$$

Rt2: In this combination the sun gear of the second planet gear is joined to the movement input by the clutch control element C1 and therefore its speed is the same as that of the planet carrier of the first planet gear. Additionally, the ring gear of the second planet gear is also joined to the casing by the control element and its speed is therefore zero. Ratio Rt2 therefore has the expression:

$$Rt2 = \frac{1}{[1+R1] \times \left[1 - \frac{1}{\left(1+\frac{1}{R1}\right) \times \left(1+\frac{1}{R2}\right)}\right]}$$

Rt3: In this combination the sun gear of the second planet gear is joined to the casing by the brake control element B1 and its speed is therefore zero. Additionally, the ring gear of the second planet gear is joined to the movement output by the clutch control element C2 and therefore its speed is the same as that of the ring gear of the first planet gear.

Ratio Rt3 therefore has the expression:

$$Rt3 = \left[\frac{1}{1+R1}\right] + \left[\frac{1}{(1+R2) \times \left(1+\frac{1}{1+R1}\right)}\right]$$

Rt4: In this combination the sun gear of the second planet gear is joined to the movement input by the clutch control element C1, and therefore its speed is the same as that of the planet carrier of the first planet gear. Additionally, the ring gear of the second planet gear is joined to the movement output by the control element C2 and therefore its speed is the same as that of the ring gear of the first planet gear. Ratio Rt4 therefore has the expression:

$Rt_4 = 1$

Ratios Rt5 to Rt8 have no purely kinematic interest but they may complement the use of this invention in some circumstances depending on the application, such as for example leaving the kinematic chain completely open or completely closed.

In the reducer configuration the movement input is carried out by the ring gear of the first planet gear, and the movement output is carried out by the planet carrier of the first planet gear. The sun gear of the first planet gear is joined to the planet carrier of the second planet gear. The sun gear and the ring gear of the second planet gear are restricted with the actuation of the control elements:

The brake control element B1 joins the sun gear of the second planet gear to the casing.
The clutch control element C1 joins the sun gear of the second planet gear to the movement input.
The brake control element B2 joins the ring gear of the second planet gear to the casing.
The clutch control element C2 joins the ring gear of the second planet gear to the output.

The control logic can be seen in the following table:

| B1 | C1 | B2 | C2 | Rt |
|---|---|---|---|---|
| activated | Deactivated | activated | deactivated | Rt1 |
| deactivated | Activated | activated | deactivated | Rt2 |
| activated | Deactivated | deactivated | activated | Rt3 |
| deactivated | Activated | deactivated | activated | Rt4 |

Low reductions close to one can be obtained by means of the described systems from conventional planetary gear trains, translating into the following advantages:

A lower number of elements. The state of the art proposes four-gear reducers with between 7 and 9 gears, whereas the present invention needs only 6 gears.

Greater commitment to manufacturability and cost due to the use of conventional pinions instead of double-toothed pinions.

The kinematic chain opens and closes at will, which allows the use of synchronization techniques during the ratio changes based on the electronic control of the input speed, minimizing the wear and work carried out by the clutches and accordingly increasing their useful life.

Use of hydraulic-hydraulic clutches with no interactive member, which allows the independent control of each of them. The presence of an interactive member means that the application of a clutch determines the cancellation of the other one which is connected through this member.

BRIEF DESCRIPTION OF THE DRAWINGS

A series of drawings is described below which aid in better understanding the invention and are expressly related to an embodiment of said invention which is presented as a non-limiting example thereof.

DETAILED DESCRIPTION OF THE PREFERREDS

Figure 1:
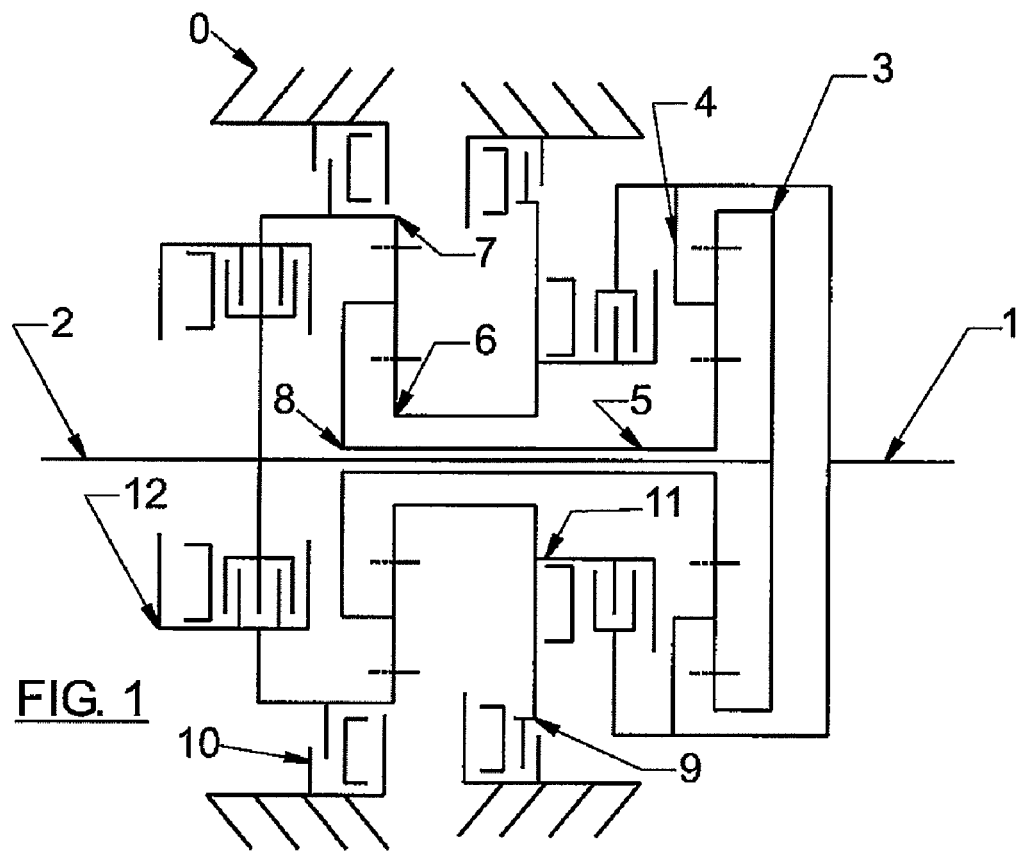
FIG. 1 shows a kinematic scheme of the low-ratio reducer-multiplier transmission system object of the present invention in its multiplier configuration.

As can be seen in the attached drawings, the low-ratio reducer-multiplier transmission system object of the present invention comprises at least:
one movement input [1];
one movement output [2];
a first ring gear [3] of the first planet gear;
a first planet carrier [4] of the first planet gear;
a first sun gear [5] of the first planet gear;
a second sun gear [6] of the second planet gear;
a second ring gear [7] of the second planet gear;
a second planet carrier [8] of the second planet gear;
one brake control element B1 [9];
one brake control element B2 [10];
one clutch control element C1 [11];
one clutch control element C2 [12];
one casing [0];

In the multiplier configuration shown in FIG. 1, the movement input [1] of the movement is carried out by the first planet carrier [4] and the movement output [2] is carried out by the first ring gear [3] of the first planet gear. The first sun gear [5] of the first planet gear is joined to the second planet carrier [8] of the second planet gear. Furthermore, the second sun gear [6] and the second ring gear [7] of the second planet gear are restricted by the control elements as follows:

The brake control element B1 [9] joins the second sun gear [6] of the second planet gear to the casing [0] when it is activated.

The clutch control element C1 [11] joins the second sun gear [6] of the second planet gear to the movement input [1] when it is activated.

The brake control element B2 [10] joins the second ring gear [7] of the second planet gear to the casing [0], when it is activated.

The clutch control element C2 [12] joins the second ring gear [7] of the second planet gear to the movement output [2], when it is activated.

The control logic can be seen in the following table:

| B1 [9] | C1 [11] | B2 [10] | C2 [12] | Rt |
|---|---|---|---|---|
| activated | Deactivated | Activated | deactivated | Rt1 |
| deactivated | Activated | Activated | deactivated | Rt2 |
| activated | Deactivated | Deactivated | Activated | Rt3 |
| deactivated | Activated | Deactivated | Activated | Rt4 |
| activated | Activated | Deactivated | deactivated | Rt5 |
| deactivated | Deactivated | Activated | Activated | Rt6 |
| deactivated | Deactivated | Deactivated | deactivated | Rt7 |
| activated | Activated | Activated | activated | Rt8 |

Figure 2:
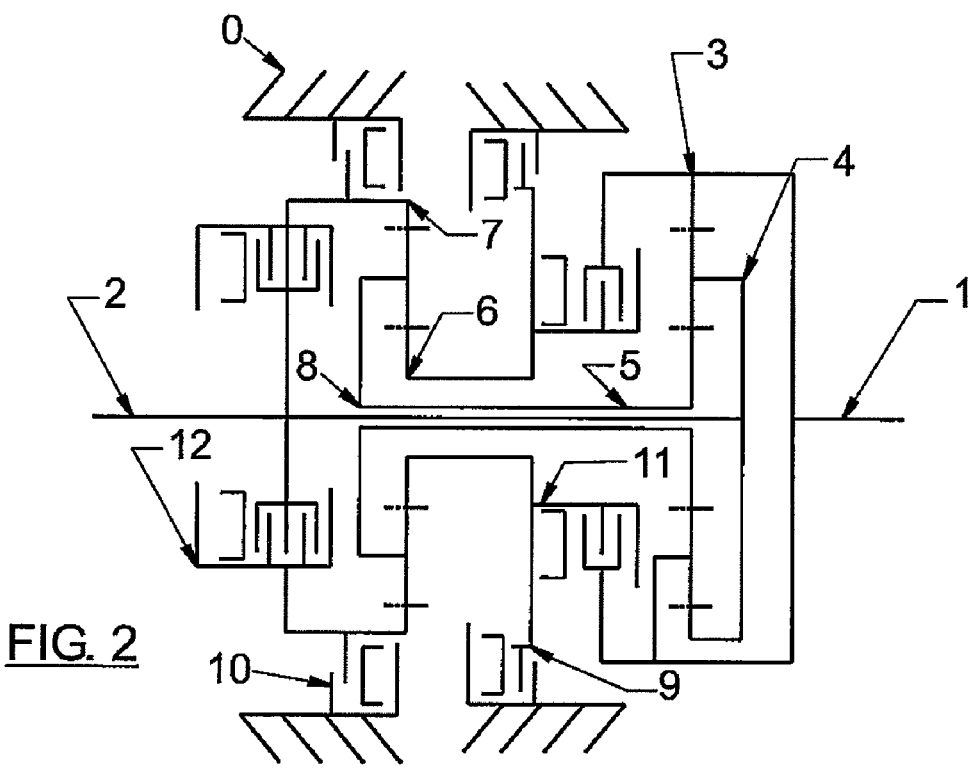
FIG. 2 shows a kinematic scheme of the low-ratio reducer-multiplier transmission system object of the present invention in its reducer configuration.

In the reducer configuration shown in FIG. 2, the movement input [1] is carried out by the first ring gear [3] of the first planet gear, and the movement output [2] is carried out the first planet carrier [4] of the first planet gear. The first sun gear [5] of the first planet gear is joined to the second planet carrier [8] of the second planet gear. Furthermore, the second sun gear [6] and the second ring gear [7] of the second planet gear are restricted by the control elements as follows:

The brake control element B1 [9] joins the second sun gear [6] of the second planet gear to the casing [0] when it is activated.

The clutch control element C1 [11] joins the second sun gear [6] of the second planet gear to the movement input [1] when it is activated.

The brake control element B2 [10] joins the second ring gear [7] of the second planet gear to the casing [0], when it is activated.

The clutch control element C2 [12] joins the second ring gear [7] of the second planet gear to the movement output [2], when it is activated.

The control logic can be seen in the following table:

| B1 [9] | C1 [11] | B2 [10] | C2 [12] | Rt |
|---|---|---|---|---|
| activated | Deactivated | Activated | deactivated | Rt1 |
| deactivated | Activated | Activated | deactivated | Rt2 |
| activated | Deactivated | Deactivated | Activated | Rt3 |
| deactivated | Activated | Deactivated | Activated | Rt4 |

The invention claimed is:

1. A low-ratio transmission system, comprising:
   an input;
   an output;
   a first ring gear of a first planet gear;
   a first planet carrier of the first planet gear;
   a first sun gear of the first planet gear;
   a second sun gear of a second planet gear;
   a second ring gear of the second planet gear;
   a second planet carrier of the second planet gear;
   a first brake control element;
   a second brake control element;
   a first clutch control element;
   a second clutch control element; and
   a casing;
   wherein the transmission system acts as a multiplier when arranged in a first configuration in which movement of the input is carried out by the first planet carrier and movement of the output is carried out by the first ring gear of the first planet gear; and
   wherein the first sun gear of the first planet gear is joined to the second planet carrier of the second planet gear when the transmission system is arranged in the first configuration, and wherein the second sun gear and the second ring gear of the second planet gear are restricted by the control elements in the following manner:
   the first brake control element joins the second sun gear of the second planet gear to the casing when activated;
   the first clutch control element joins the second sun gear of the second planet gear to the movement input when activated;
   the second brake control element joins the second ring gear of the second planet gear to the casing when activated;
   the second clutch control element joins the second ring gear of the second planet gear to the movement output when activated.

2. A low-ratio transmission system according to claim 1, wherein a ratio Rt, ratio of input speed with respect to output speed, acquires at least the following values:
   Rt1, with the first and second brake control elements activated and the first and second clutch control elements deactivated;
   Rt2, with the first brake control element and the second clutch control element deactivated and the second brake control element and the first clutch control element activated;
   Rt3, with the first brake control element and the second clutch control element activated and the second brake control element and the first clutch control element deactivated; and
   Rt4, with the first and second brake control elements deactivated and the first and second clutch control elements activated.

3. A low-ratio transmission system according to claim 1, wherein a ratio Rt being controlled by a ratio between a number of teeth of the sun gear and of the ring gear in each planet gear and wherein the ratio Rt follows a geometric progression $X^n$, wherein X is not less than 1.06 and not more than 1.17 when the transmission system is arranged in the second configuration and not less than 0.85 and not more than 0.94 when the transmission system is arranged in the first configuration.

4. A low-ratio transmission system according to claim 1, wherein activation and deactivation of the control elements is controlled independently of one another by one of:
   electronic means;
   mechanical means;
   hydraulic means.

* * * * *